US012670897B2

(12) United States Patent
Xu et al.

(10) Patent No.: US 12,670,897 B2
(45) **Date of Patent: *Jun. 30, 2026**

(54) METHOD, APPARATUS, STORAGE MEDIUM, AND ELECTRONIC DEVICE FOR SPEECH SYNTHESIS

(71) Applicant: BEIJING YOUZHUJU NETWORK TECHNOLOGY CO. LTD., Beijing (CN)

(72) Inventors: Chenchang Xu, Beijing (CN); Junjie Pan, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 378 days.

This patent is subject to a terminal disclaimer.

(21) Appl. No.: 18/041,983

(22) PCT Filed: Oct. 26, 2021

(86) PCT No.: PCT/CN2021/126394

§ 371 (c)(1),
(2) Date: Feb. 16, 2023

(87) PCT Pub. No.: WO2022/095754

PCT Pub. Date: May 12, 2022

(65) Prior Publication Data

US 2023/0326446 A1 Oct. 12, 2023

(30) Foreign Application Priority Data

Nov. 3, 2020 (CN) ......................... 202011212351.0

(51) Int. Cl.
*G10L 13/10* (2013.01)
*G10L 13/04* (2013.01)
(Continued)

(52) U.S. Cl.
CPC .............. *G10L 13/10* (2013.01); *G10L 13/04* (2013.01); *G10L 13/06* (2013.01); *G10L 25/18* (2013.01)

(58) Field of Classification Search
CPC ......... G10L 13/10; G10L 13/04; G10L 13/06; G10L 25/18; G10L 13/027
See application file for complete search history.

(56) References Cited

U.S. PATENT DOCUMENTS 10,872,598 B2 12/2020 Arik et al.
2007/0038455 A1 2/2007 Murzina et al.
(Continued)

FOREIGN PATENT DOCUMENTS

CN 101223572 A 7/2008
CN 108510975 A 9/2018
(Continued)

OTHER PUBLICATIONS

International Patent Application No. PCT/CN2021/126394; Int'l Search Report; dated Jan. 30, 2022; 3 pages.
(Continued)

*Primary Examiner* — Daniel C Washburn
*Assistant Examiner* — Penny L Caudle
(74) *Attorney, Agent, or Firm* — BakerHostetler

(57) ABSTRACT

The present disclosure relates to a method, apparatus, storage medium and electronic device for speech synthesis. The present disclosure enables: acquiring a text to be synthesized marked with stress words; inputting the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized in the
(Continued)

following manner: determining a sequence of phonemes corresponding to the text to be synthesized; determining phoneme level stress labels according to the stress words marked in the text to be synthesized; generating audio information corresponding to the text to be synthesized according to the sequence of phonemes and the stress labels.

18 Claims, 5 Drawing Sheets

(51) Int. Cl.
*G10L 13/06* (2013.01)
*G10L 25/18* (2013.01)

(56) References Cited

U.S. PATENT DOCUMENTS

| | | | |
|---|---|---|---|
| 2021/0027762 A1 | 1/2021 | Arik et al. | |
| 2021/0035551 A1* | 2/2021 | Stanton | G10L 13/04 |

FOREIGN PATENT DOCUMENTS

| | | | |
|---|---|---|---|
| CN | 109087627 | A | 12/2018 |
| CN | 109686359 | A | 4/2019 |
| CN | 109686395 | A | 4/2019 |
| CN | 109949791 | A | 6/2019 |
| CN | 110299131 | A | 10/2019 |
| CN | 110379409 | A | 10/2019 |
| CN | 111292763 | A | 6/2020 |
| CN | 111583904 | A | 8/2020 |
| CN | 111667816 | A | 9/2020 |
| CN | 112331176 | A | 2/2021 |
| JP | 2017-090856 | A | 5/2017 |
| JP | 2018-106012 | A | 7/2018 |
| JP | 2018-169434 | A | 11/2018 |

OTHER PUBLICATIONS

Wang et al.; "TACTRON: Towards End-to-End Speech Synthesis"; arXiv:1703.10135; Apr. 2017; 10 pages.

* cited by examiner

METHOD, APPARATUS, STORAGE MEDIUM, AND ELECTRONIC DEVICE FOR SPEECH SYNTHESIS

CROSS-REFERENCE TO RELATED APPLICATIONS

This application is a U.S. National Stage Application under 35 U.S.C. § 371 of PCT International Application No. PCT/CN2021/126394 filed on Oct. 26, 2021, which is based on and claims priority of Chinese Patent Application No. 202011212351.0, filed to the China National Intellectual Property Administration on Nov. 3, 2020, the disclosure of both of which are incorporated by reference herein in their entireties.

TECHNICAL FIELD

The present disclosure relates to the field of speech synthesis technology, and in particular, to a method, apparatus, storage medium and electronic device for speech synthesis.

BACKGROUND

Speech synthesis, also known as Text To Speech (TTS), is a technology that can convert any input text into corresponding speech. Traditional speech synthesis systems usually include two modules: front-end and back-end. The front-end module mainly analyzes input text and extracts linguistic information needed by the back-end module. The back-end module generates a speech waveform through a certain method according to the analysis results from the front-end.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

In a first aspect, the present disclosure provides a method for speech synthesis, the method comprising:

- acquiring a text to be synthesized marked with stress words;
- inputting the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized in the following manner:
- determining a sequence of phonemes corresponding to the text to be synthesized;
- determining phoneme level stress labels according to the stress words marked in the text to be synthesized;
- generating audio information corresponding to the text to be synthesized according to the sequence of phonemes and the stress labels.

In a second aspect, the present disclosure provides an apparatus for speech synthesis, the apparatus comprising:

- an acquisition module configured to acquire a text to be synthesized marked with stress words;
- a synthesis module configured to input the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized by following modules:
- a first determination submodule configured to determine a sequence of phonemes corresponding to the text to be synthesized;
- a second determination submodule configured to determine phoneme level stress labels according to the stress words marked in the text to be synthesized;
- a generation submodule configured to generate audio information corresponding to the text to be synthesized according to the sequence of phonemes and the stress labels.

In a third aspect, the present disclosure provides a computer-readable medium having a computer program stored thereon, which, when executed by a processing apparatus, implements the steps of the method in the first aspect.

In a fourth aspect, the present disclosure provides an electronic device, comprising:

- a storage apparatus having a computer program stored thereon;
- a processing apparatus configured to execute the computer program in the storage apparatus to implement the steps of the method in the first aspect.

In a fifth aspect, the present disclosure provides a computer program product comprising instructions, which, when executed by a computer, cause the computer to implement the steps of the method in the first aspect.

Other features and advantages of the present disclosure will be described in detail in the following Detailed Description section.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings.

DETAILED DESCRIPTION

Figure 1A:
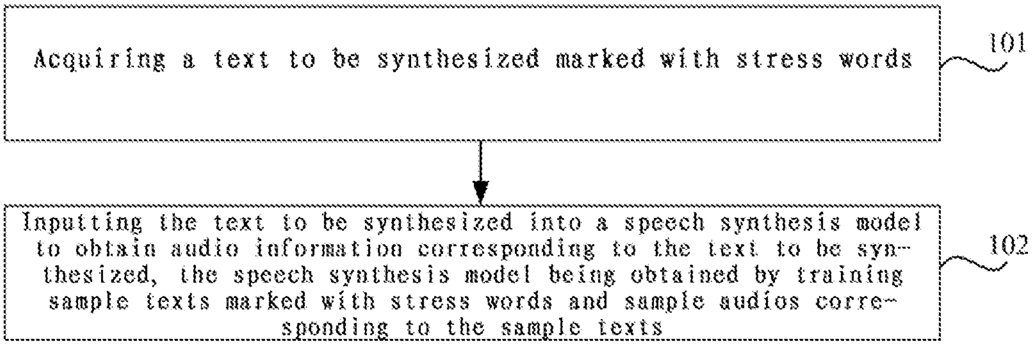
FIGS. 1A and 1B are flowcharts of a method for speech synthesis according to an exemplary embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description. It should be noted that the concepts of "first" and "second" etc. mentioned in the present disclosure are only used to distinguish between different apparatus, modules or units, and are not used to limit the order of functions performed by these apparatus, modules or units or their interdependence. In addition, it should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

Speech synthesis methods in the related arts usually do not consider stresses in synthesized speech, resulting in no stress in the synthesized speech, flat pronunciation and lack of expressiveness. Or, the speech synthesis methods in the related arts usually randomly select words in an input text to add stresses, resulting in incorrect pronunciations of stresses in the synthesized speech, and failing to obtain a better speech synthesis result containing stresses.

In view of this, the present disclosure provides a method, apparatus, storage medium and electronic device for speech synthesis, with a new way of speech synthesis, the synthesized speech is enabled to include stressed pronunciations, and the stressed pronunciations in the synthesized speech is enabled to conform to the actual stressed pronunciation habits, thereby improving the accuracy of stressed pronunciations in synthesized speech.

FIG. 1A is a flowchart of a method for speech synthesis according to an exemplary embodiment of the present disclosure. With reference to FIG. 1A, the method for speech synthesis comprises:

Step 101: acquiring a text to be synthesized marked with stress words.

Step 102: inputting the text to be synthesized into a speech synthesis model to obtain audio information corresponding to the text to be synthesized, the speech synthesis model being obtained by training sample texts marked with stress words and sample audios corresponding to the sample texts.

With above manner, a speech synthesis model can be trained according to sample texts marked with stress words and sample audios corresponding to the sample texts, and the trained speech synthesis model can generate audio information including stressed pronunciations according to the text to be synthesized marked with stress words. Since the speech synthesis model is obtained by training according to a large number of sample texts marked with stress words, the accuracy of generated audio information can be guaranteed to a certain extent compared to the way of randomly adding stressed pronunciations in the related arts.

Figure 1B:
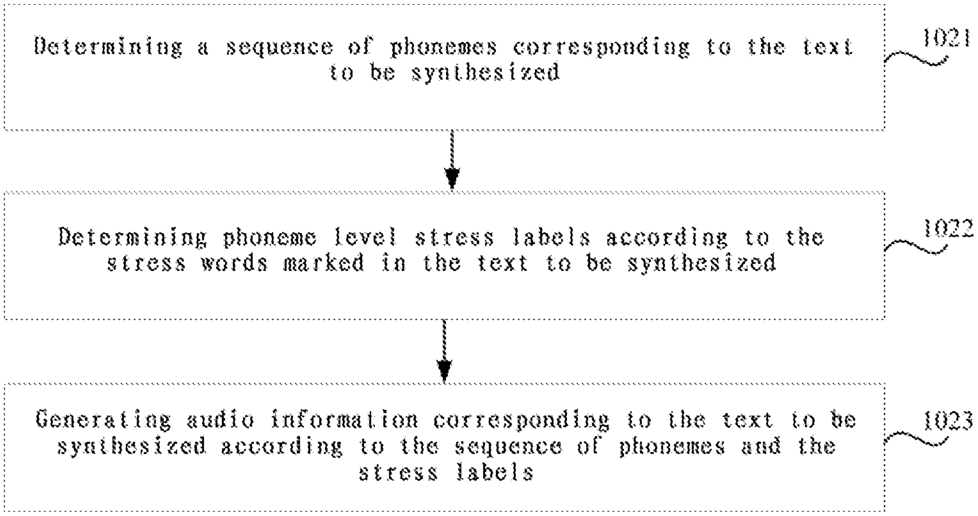

According to some embodiments of the present disclosure, referring to FIG. 1B, the method for speech synthesis may include adopting the speech synthesis model to process the text to be synthesized in the following manner, comprising:

Step 1021, determining a sequence of phonemes corresponding to the text to be synthesized;

Step 1022, determining phoneme level stress labels according to the stress words marked in the text to be synthesized;

Step 1023: generating audio information corresponding to the text to be synthesized according to the sequence of phonemes and the stress labels.

With above manner, the speech synthesis model can perform speech synthesis processing in a case that a text to be synthesized is extended to a phoneme level, so stresses in the synthesized speech can be controlled at the phoneme level, thereby further improving the accuracy of stressed pronunciations in the synthesized speech.

In order to make those skilled in the art better understand the method for speech synthesis provided by the present disclosure, the above steps are described in detail below.

First, a process for training a speech synthesis model will be described.

According to some embodiments of the present disclosure, a plurality of sample texts and sample audios corresponding to the plurality of sample texts for training may be acquired in advance, wherein each sample text is marked with stress words, that is, each sample text is marked with words that require stressed pronunciations.

Figure 1C:
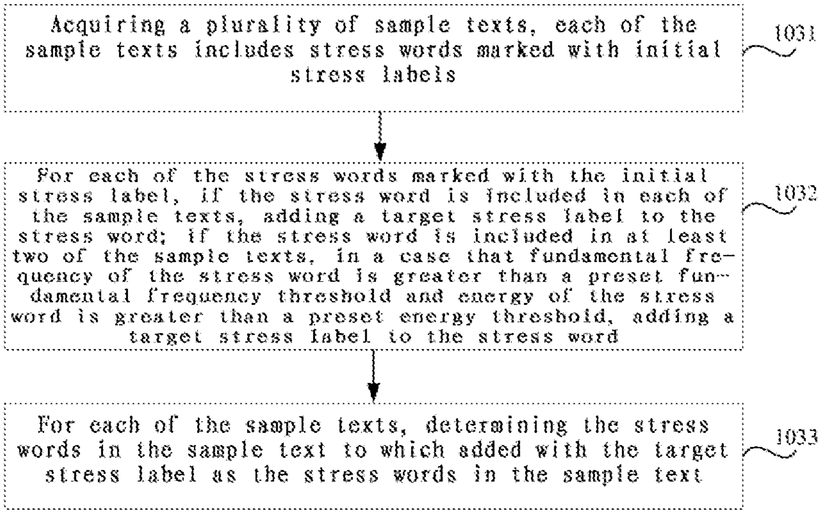
FIG. 1C is a flowchart of a process for determining stress words according to an exemplary embodiment of the present disclosure.

In some embodiments, referring to FIG. 1C, determination of stress words in a sample text may comprises:

Step 1031, acquiring a plurality of sample texts, each sample text includes stress words marked with initial stress labels, Step 1032, for each stress word marked with the initial stress label, if the stress word is marked as a stress word in each sample text, adding a target stress label to the stress word; if the stress word is marked as a stress word in at least two sample texts, in a case that fundamental frequency of the stress word is greater than a preset fundamental frequency threshold and energy of the stress word is greater than a preset energy threshold, adding a target stress label to the stress word, Step 1033: for each of the sample texts, determining the stress words in the sample to which added with the target stress label as the stress words in the sample text.

According to some embodiments of the present disclosure, the plurality of sample texts may be sample texts including the same content and marking initial stress labels by different users, or may be a plurality of texts including different content and the texts including the same content being marked initial stress labels by different users, etc., which are not limited in the embodiment of the present disclosure. It should be understood that, in order to improve the accuracy of the results, it is preferable that the plurality of sample texts are a plurality of texts including different content and the texts including the same content being marked initial stress labels by different users.

As an example, firstly, time boundary information of each word in a sample text in a sample audio can be acquired through an automatic alignment model, so as to obtain time boundary information of each word and each prosodic phrase in the sample text. Then, a plurality of users can mark stress words at prosodic phrase level according to the aligned sample audio and sample text, in combination with auditory sense, waveform graph, spectrum, and semantic information acquired from the sample text, obtaining a plurality of sample texts with initial stress labels. Wherein, prosodic phrases are intermediate rhythmic chunks between prosodic words and intonation phrases. Prosodic words are a group of syllables that are closely related in actual speech flow and are often pronounced together. Intonation phrases connect several prosodic phrases according to a certain intonation pattern, generally corresponding to sentences in syntax. In the embodiment of the present disclosure, initial stress labels in a sample text may correspond to prosodic phrases, so as to obtain initial stress labels at the prosodic phrase level, such that stressed pronunciations are more in line with conventional pronunciation habits.

In the embodiment of the present disclosure, or in other possible situations, initial stress labels in a sample text may correspond to a single letter or word, so as to obtain stresses at word level or stresses at single letter level, etc. In specific implementation, chooses can be made as needed.

After obtaining a plurality of sample texts with initial stress labels, the initial stress labels in the plurality of sample texts can be integrated. Specifically, for each stress word marked with an initial stress label, if the stress word is marked as a stress word in every sample text, it means that the marking result of this stress is relative accurate, so a target stress label can be added to the stress word. If the stress word is marked as a stress word in at least two sample texts, it means that there is situation that the stress word is not marked as a stress word in other sample texts, which indicates that there may be a certain deviation in the marking result of this stress. In this case, in order to improve the accuracy of the results, further judgment can be made. For example, considering that the fundamental frequency of a stressed pronunciation in an audio is higher than that of an unstressed pronunciation, and the energy of a stressed pronunciation in an audio is higher than that of an unstressed pronunciation, so in a case that the fundamental frequency of the stress word is higher than a preset fundamental frequency threshold and the energy of the stress word is greater than a preset energy threshold, a target stress label is added to the stress word. Wherein, the preset fundamental frequency threshold and the preset energy threshold may be set according to actual situations, which are not limited in the embodiment of the present disclosure.

It should be understood that, in other possible cases, if a stress word is not included in all other sample texts, it means that the stress word is only marked as stress in one sample text, thus the stress word is less likely to have stress, so that no target stress label can be added to the stress word.

With above manner, stress label screening can be performed on sample texts marked with initial stress labels, that is, sample texts added with target stress labels can be obtained, so that for each sample text, stress words added with target stress labels can be determined as target stress labels, so that stress label information in sample texts are more accurate.

After the sample texts marked with stress words are obtained, a speech synthesis model can be trained according to the plurality of sample texts marked with stress words and the sample audios corresponding to the plurality of sample texts respectively.

Figure 1D:
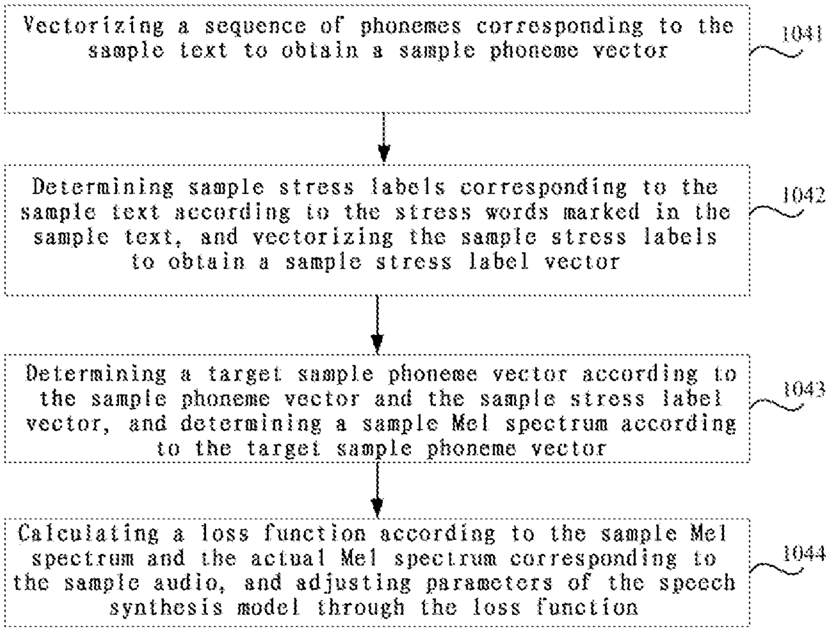
FIG. 1D is a flowchart of a process for determining a speech synthesis model according to an exemplary embodiment of the present disclosure.

In the embodiment of the present disclosure, referring to FIG. 1D, a process for training a speech synthesis model may comprise:

Step 1041, vectorizing a sequence of phonemes corresponding to the sample text to obtain a sample phoneme vector, Step 1042, determining sample stress labels corresponding to the sample text according to the stress words marked in the sample text, and vectorizing the sample stress labels to obtain a sample stress label vector at phoneme level, Step 1043, determining a target sample phoneme vector according to the sample phoneme vector and the sample stress label vector, and determining a sample Mel spectrum according to the target sample phoneme vector, Step 1044, calculating a loss function according to the sample Mel spectrum and the actual Mel spectrum corresponding to the sample audio, and adjusting parameters of the speech synthesis model through the loss function.

It should be understood that phonemes are the smallest phonetic units divided according to natural properties of speech, and are divided into two categories: vowels and consonants. For Chinese, phonemes include initials (initials are consonants that are used in front of finals and form a complete syllable with the finals) and finals (that is, vowels). For English, phonemes include vowels and consonants. In the embodiment of the present disclosure, in the training phase of the speech synthesis model, a sequence of phonemes corresponding to a sample text is firstly vectorized to obtain a sample phoneme vector, and in the subsequent process, a speech with the phoneme level stress can be synthesized, so that stresses in the synthesized speech is controllable at phoneme level, thereby further improving the accuracy of stressed pronunciations in the synthesized speech. Wherein, the process of vectorizing the sequence of phonemes corresponding to the sample text to obtain the sample phoneme vector is similar to the method for vector conversion in the related arts, which will not be repeated here.

As an example, determining the sample stress labels corresponding to the sample text according to the stress words marked in the sample text may be to generate a sequence of stresses represented by 0 and 1 according to the stress words marked in the sample text. Wherein, 0 means that no stress is marked, and 1 means that there is marked with stress. Then, the sample stress labels can be vectorized to obtain a sample stress label vector. In specific applications, the sequence of phonemes corresponding to the sample text can be determined first, and then according to the stress words marked in the sample text, stresses marking is performed in the sequence of phonemes corresponding to the sample text, so as to obtain the phoneme level sample stress labels corresponding to the sample text, and then the sample stress labels are vectorized to obtain a phoneme level sample stress label vector. Wherein, the method of vectorizing the sample stress labels to obtain the phoneme level sample stress label vectors is similar to the method for vector conversion in the related arts, which will not be repeated here.

After obtaining the sample phoneme vector and the sample stress label vector, a target sample phoneme vector can be determined according to the sample phoneme vector and the sample stress label vector, so as to determine a sample Mel spectrum according to the target sample phoneme vector. Wherein, considering that the sample phoneme vector and the sample stress label vector characterize two independent pieces of information, the target sample phoneme vector can be obtained by the way of splicing the sample phoneme vector and the sample stress label vector, rather than by adding the sample phoneme vector and the sample stress label vector, so as to avoid destroying the content independence between the sample phoneme vector and the sample stress label vector, and ensure the accuracy of the results output by the speech synthesis model.

In some embodiments, determining the sample Mel spectrum according to the target sample phoneme vector may be: inputting the target sample phoneme vector into an encoder, and then inputting the vector output by the encoder into the decoder to obtain the sample Mel spectrum; wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme. Alternatively, a frame level vector corresponding to the vector output by the encoder can also be determined by an automatic alignment model, and then the frame level vector can be input into the decoder to obtain the sample Mel spectrum, wherein the automatic alignment model is used to make the phoneme level pronunciation information in the sample text corresponding to the target sample phoneme vector in one-to-one correspondence with the frame time of each phoneme in the sample audio corresponding to the target sample phoneme vector, so as to improve the model training effect, thereby further improving the accuracy of stressed pronunciations in the synthesized speech by the model.

Figure 2:
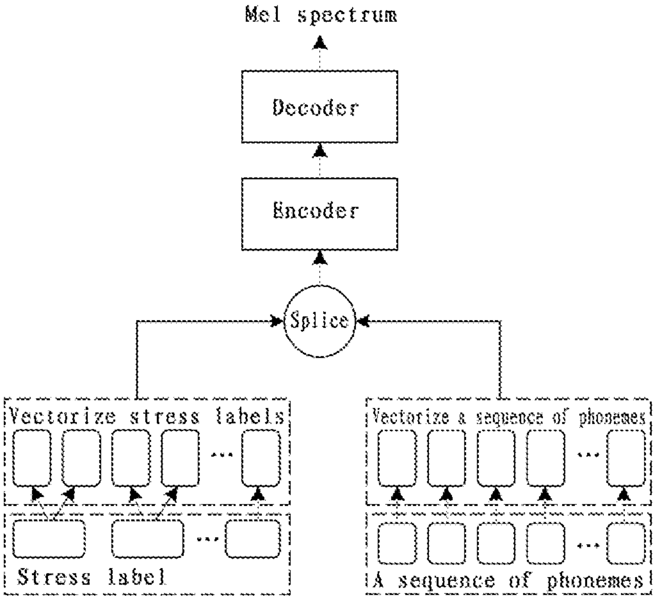
FIG. 2 is a schematic diagram of a speech synthesis model in a method for speech synthesis according to an exemplary embodiment of the present disclosure.

As an example, the speech synthesis model may be an end-to-end speech synthesis Tacotron model, accordingly, the encoder may be the encoder in the Tacotron model, and the decoder may be the decoder in the Tacotron model. For example, the speech synthesis model is shown in FIG. 2. In the training phase of the speech synthesis model, after a vectorized sequence of phonemes (such as a sample phoneme vector) and vectorized stress labels (such as a sample stress label vector) are spliced to obtain a target sample phoneme vector, the target sample phoneme vector can be input into an encoder (Encoder) to obtain pronunciation information of each phoneme in the sequence of phonemes corresponding to the target sample phoneme vector. For example, if a sequence of phonemes corresponding to a target sample phoneme vector includes a phoneme "jin", it is necessary to know that the pronunciation of the phoneme is the same as "“今”". Then, phoneme level and frame level alignment can be achieved through an automatic alignment model, obtaining a frame level target sample vector corresponding to the vector output by the encoder. Next, the target sample vector can be input into a decoder (Decoder), so that the decoder performs conversion processing according to the pronunciation information of each phoneme in the sequence of phonemes corresponding to the target sample vector, so as to obtain a sample Mel spectrum corresponding to each phoneme (Mel spectrum).

Figure 3:
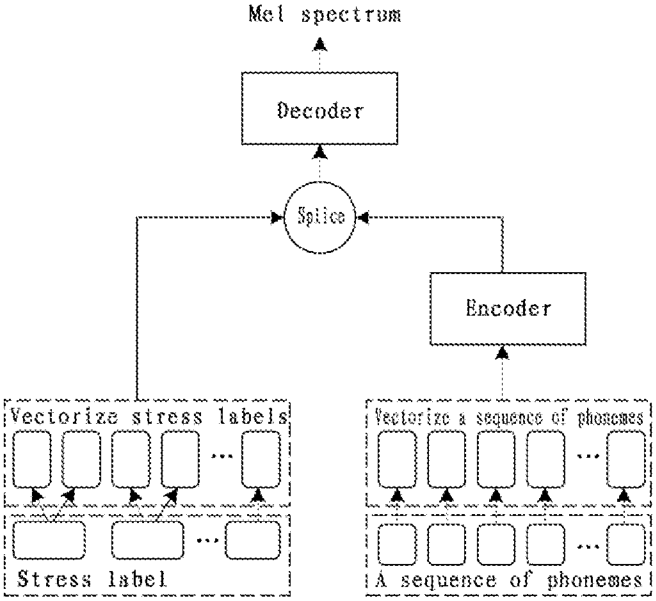
FIG. 3 is a schematic diagram of a speech synthesis model in a method for speech synthesis according to another exemplary embodiment of the present disclosure.

In another possible implementation, referring to FIG. 3, the sample phoneme vector can also be input into the encoder first, and then the vector output by the encoder is spliced with the sample stress label vector to obtain a target sample phoneme vector, so that the sample Mel spectrum is determined according to the target sample phoneme vector. In practical applications, the splicing process may be selected to be set before the encoder or after the encoder as needed, which is not limited in the embodiment of the present disclosure.

After the sample Mel spectrum is obtained, a loss function can be calculated according to the sample Mel spectrum and the actual Mel spectrum corresponding to the sample audio, and parameters of the speech synthesis model can be adjusted through the loss function. For example, the MSE loss function can be calculated according to the sample Mel spectrum and the actual Mel spectrum, and then parameters of the speech synthesis model can be adjusted through the MSE loss function. Alternatively, model optimization can also be performed through an Adam optimizer to ensure the accuracy of the results output by the speech synthesis model after training.

After the speech synthesis model is obtained by training in the above manner, then the speech synthesis model can be used to perform speech synthesis on a text to be synthesized marked with stress words. That is to say, for the text to be synthesized marked with stress words, the speech synthesis model can output audio information corresponding to the text to be synthesized, and the audio information contains stressed pronunciations corresponding to the stress words marked in the text to be synthesized, thereby the problems of no stresses in synthesized speeches in the related arts, and reducing wrong stressed pronunciations can be solved, and the accuracy of stressed pronunciations in the synthesized speech can be improved.

As an example, a user can mark stress words in a text to be synthesized according to usual stressed pronunciation habits. For example, the text to be synthesized is "The weather is so good today." According to usual stressed pronunciation habit, the "good" in the text to be synthesized can be marked as a stress word. The user can then input the text to be synthesized marked with the stress word into an electronic device for speech synthesis. Accordingly, the electronic device may, in response to the user's operation of inputting the text to be synthesized, acquire the text to be synthesized marked with stress words for speech synthesis. Wherein, the embodiments of the present disclosure do not limit the specific content and content length of the text to be synthesized, for example, the text to be synthesized may be a single sentence, or may also be multiple sentences, and so on.

After acquiring the text to be synthesized marked with stress words, the electronic device may input the text to be synthesized into a pre-trained speech synthesis model. As an example, the speech synthesis model can first determine a sequence of phonemes corresponding to the text to be synthesized, so that in the subsequent process, a speech with stresses can be synthesized at phoneme level, so that the stresses in the synthesized speech is controllable at the phoneme level, further improving the accuracy of stressed pronunciations in the synthesized speech.

While or after the sequence of phonemes corresponding to the text to be synthesized is determined, phoneme level stress labels may also be determined according to the stress words marked in the text to be synthesized. As an example, the stress labels may be a sequence represented by 0 and 1, where 0 means that corresponding phoneme in the text to be synthesized is not marked with stress, and 1 means that corresponding phoneme in the text to be synthesized is marked with stress. In a specific application, the sequence of phonemes corresponding to the text to be synthesized can be determined first, and then according to the stress words marked in the text to be synthesized, stresses marking is performed in the sequence of phonemes, so as to obtain phoneme level stress labels.

After the sequence of phonemes corresponding to the text to be synthesized and the stress labels is obtained, audio information corresponding to the text to be synthesized can be generated according to the sequence of phonemes and the stress labels. As an example, the speech synthesis model can vectorize the sequence of phonemes corresponding to the text to be synthesized to obtain a phoneme vector, and vectorize the stress labels to obtain a stress label vector, and then determine a target phoneme vector according to the phoneme vector and the stress label vector, and determine a Mel spectrum according to the target phoneme vector, and finally input the Mel spectrum into a vocoder to obtain audio information corresponding to the text to be synthesized.

It should be understood that the process of vectorizing the sequence of phonemes corresponding to the text to be synthesized to obtain the phoneme vector, and the process of vectorizing the stress labels corresponding to the text to be synthesized to obtain the stress label vector are similar with the method for vector conversion in the related arts, which will not be repeated here.

As an example, considering that the phoneme vector and the stress label vector characterize two independent pieces of information, the target phoneme vector can be obtained by the way of splicing the phoneme vector and the stress label vector, rather than by adding the phoneme vector and the stress label vector, so as to avoid destroying the content independence between the phoneme vector and the stress label vector, and ensure the accuracy of subsequent speech synthesis results.

After the target phoneme vector is obtained, a Mel spectrum can be determined according to the target phoneme vector. As an example, the target phoneme vector can be input into an encoder, and a vector output by the encoder can be input into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

For example, as shown in FIG. 2, the speech synthesis model in the embodiment of the present disclosure may include an encoder (Encoder) and a decoder (Decoder). Accordingly, after the target phoneme vector is obtained by splicing, the target phoneme vector can be input into the encoder to obtain pronunciation information of each phoneme in the sequence of phonemes corresponding to the target phoneme vector. For example, for the phoneme “jin”, it is necessary to know that the pronunciation of the phoneme is the same as “"今"”. Then, the pronunciation information can be input into the decoder, to perform conversion processing by the decoder according to the pronunciation information of each phoneme in the sequence of phonemes corresponding to the target phoneme vector, so as to obtain the Mel spectrum corresponding to each phoneme.

Alternatively, in other possible manners, the phoneme vector may be input into the encoder, and the target phoneme vector may be determined according to the vector output by the encoder and the stress label vector. Accordingly, the target phoneme vector can be input into the decoder to obtain corresponding Mel spectrum. For example, referring to FIG. 3, the phoneme vector is first input into the encoder, and then the vector output by the encoder is spliced with the stress label vector to obtain the target phoneme vector, thereby determining the Mel spectrum according to the target phoneme vector.

After the Mel spectrum is determined, the Mel spectrum can be input into the vocoder to obtain audio information corresponding to the text to be synthesized. It should be understood that the embodiments of the present disclosure do not limit the type of the vocoder, that is to say, audio information with stresses can be obtained by inputting the Mel spectrum into any vocoder, and the stresses in the audio information corresponds to the stress words marked in the synthesized text, thereby the problems of no stresses in synthesized speeches or wrong stressed pronunciations due to randomly specified stresses in the related arts can be solved, and the accuracy of stressed pronunciations in the synthesized speech can be improved.

Figure 4:
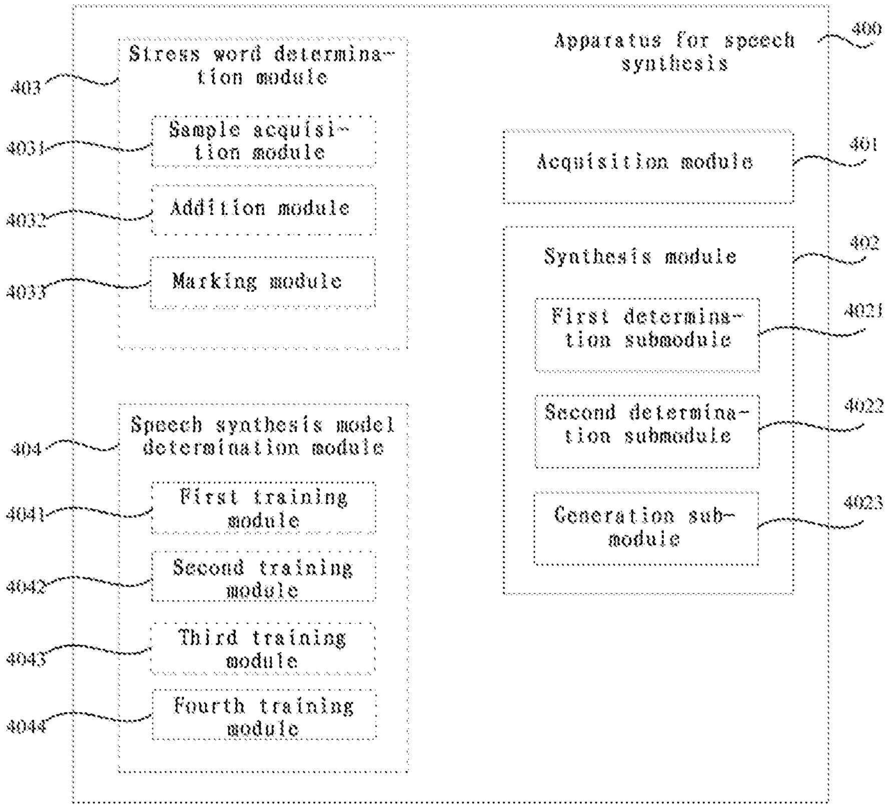
FIG. 4 is a block diagram of an apparatus for speech synthesis according to an exemplary embodiment of the present disclosure.

According to an embodiment of the present disclosure, the present disclosure further provides an apparatus for speech synthesis, which may become part or all of an electronic device through software, hardware, or a combination of the software and hardware. With reference to FIG. 4, the apparatus for speech synthesis 400 comprises:

an acquisition module 401 configured to acquire a text to be synthesized marked with stress words;

a synthesis module 402 configured to input the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized by following modules:

a first determination submodule 4021 configured to determine a sequence of phonemes corresponding to the text to be synthesized;

a second determination submodule 4022 configured to determine phoneme level stress labels according to the stress words marked in the text to be synthesized;

a generation submodule 4023 configured to generate audio information corresponding to the text to be synthesized according to the sequence of phonemes and the stress labels.

In some embodiments, the generation submodule 4023 is configured to:

vectorize the sequence of phonemes corresponding to the text to be synthesized to obtain a phoneme vector, and vectorize the stress labels to obtain a stress label vector;

determine a target phoneme vector according to the phoneme vector and the stress label vector;

determine a Mel spectrum according to the target phoneme vector;

input the Mel spectrum into a vocoder to obtain audio information corresponding to the text to be synthesized.

In some embodiments, the generation submodule 4023 is configured to:

input the target phoneme vector into an encoder, and input a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

In some embodiments, the generation submodule 4023 is configured to:

input the phoneme vector into an encoder, and determine the target phoneme vector according to the vector output by the encoder and the stress label vector;

input the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

In some embodiments, the apparatus 400 may further include a stress word determination module 403, and the stress word determination module 403 may include the following modules:

a sample acquisition module 4031 configured to acquire a plurality of sample texts, each of which includes stress words marked with initial stress labels;

an addition module 4032 configured to, for each of the stress words marked with the initial stress label, if the stress word is included in each of the sample texts, add a target stress label to the stress word; if the stress word is included in at least two of the sample texts, in a case that the fundamental frequency of the stress word is greater than a preset fundamental frequency threshold and the energy of the stress word is greater than a preset energy threshold, add a target stress label to the stress word;

a marking module 4033 configured to, for each of the sample texts, determine stress words in the sample text to which added with the target stress label as the stress words in the sample text.

In some embodiments, the apparatus 400 may further include a speech synthesis model determination module 404, and the speech synthesis model determination module 404 includes the following modules:

a first training module 4041 configured to vectorize a sequence of phonemes corresponding to the sample text to obtain a sample phoneme vector;

a second training module 4042 configured to determine sample stress labels corresponding to the sample text according to the stress words marked in the sample text, and vectorize the sample stress labels to obtain a sample stress label vector;

a third training module 4043 configured to determine a target sample phoneme vector according to the sample phoneme vector and the sample stress label vector, and determine a sample Mel spectrum according to the target sample phoneme vector;

a fourth training module 4044 configured to calculate a loss function according to the sample Mel spectrum and the actual Mel spectrum corresponding to the sample audio, and adjust parameters of the speech synthesis model through the loss function.

Regarding the apparatus in above embodiments, the specific implementations in which various module perform operations have been described in detail in the method embodiments, which will not be set forth in detail here. It should be noted that the division of the above modules does not limit the specific implementations, and the above modules may be implemented in software, hardware, or a combination of software and hardware, for example. In actual implementations, the above modules may be implemented as independent physical entities, or may also be implemented by a single entity (e.g., a processor (CPU or DSP, etc.), an integrated circuit, etc.). It should be noted that although each module is shown as a separate module in FIG. 4, one or more of these modules may also be combined into one module, or split into multiple modules. In addition, the above stress word determination module and speech synthesis model determination module are shown with dotted lines in the drawings to indicate that these modules do not have to be included in the apparatus for speech synthesis, but can be implemented outside the apparatus for speech synthesis or can be implemented by other device outside the apparatus for speech synthesis and informs the apparatus for speech synthesis of the results. Alternatively, the above stress word determination module and speech synthesis model determination module are shown with dotted lines in the drawings to indicate that these modules may not actually exist, and the operations/functions they implement can be implemented by the apparatus for speech synthesis itself.

According to some embodiments of the present disclosure, the present disclosure also provides a computer-readable medium having a computer program stored thereon, which, when executed by a processing apparatus, implements the steps of any of the above methods for speech synthesis.

According to some embodiments of the present disclosure, the present disclosure also provides an electronic device, comprising:

a storage apparatus having a computer program stored thereon;

a processing apparatus configured to execute the computer program in the storage apparatus, so as to implement the steps of any of the above methods for speech synthesis.

According to some embodiments of the present disclosure, the present disclosure also provides a computer program product comprising instructions, which, when executed by a computer, cause the computer to implement the steps of any of the above methods for speech synthesis.

Figure 5:
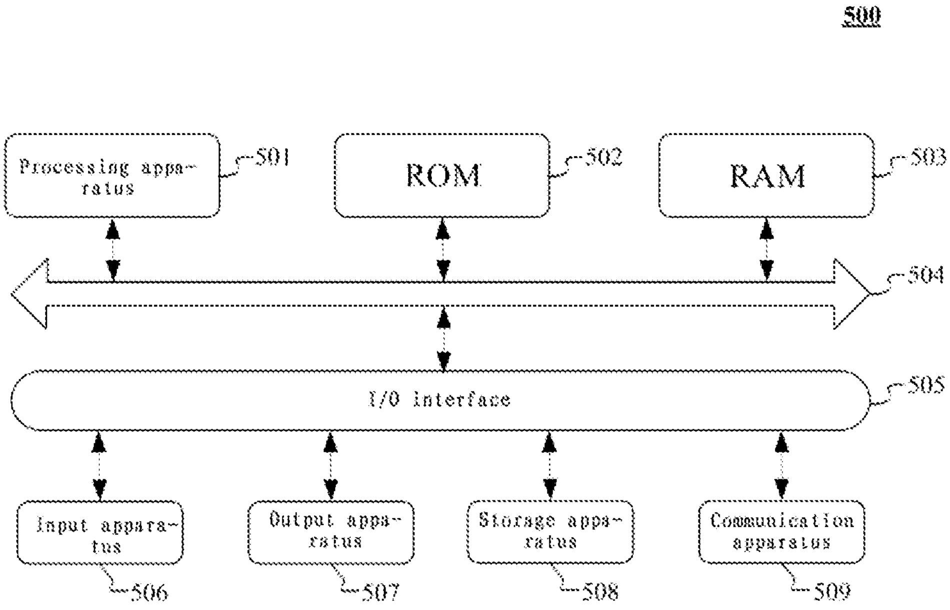
FIG. 5 is a block diagram of an electronic device according to an exemplary embodiment of the present disclosure.

Referring to FIG. 5 below, it shows a schematic structural diagram suitable for implementing an electronic device 500 in an embodiment of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 5 is only one example, and should not bring any limitation to functions and usage scopes of embodiments of the present disclosure.

As shown in FIG. 5, the electronic device 500 may include a processing apparatus (for example a central processing unit, a graphics processor, etc.) 501, which can execute various appropriate actions and processes according to a program stored in a read-only memory (ROM) 502 or a program loaded from a storage 508 into a random-access memory (RAM) 503. In the RAM 503, various programs and data required for the operation of the electronic device 500 are also stored. The processing apparatus 501, ROM 502, and RAM 503 are connected to each other through a bus 504. An input/output (I/O) interface 505 is also connected to the bus 504.

Generally, the following apparatus can be connected to the I/O interface 505: an input device 506 including for example, a touch screen, a touch pad, a keyboard, a mouse, a camera, a microphone, an accelerometer, a gyroscope, etc.; an output device 507 including for example, a liquid crystal display (LCD), a speaker, a vibrator, etc.; a storage 508 including for example, a magnetic tape, a hard disk, etc.; and a communication apparatus 509. The communication apparatus 509 may allow the electronic device 500 to perform wireless or wired communication with other devices to exchange data. Although FIG. 5 shows an electronic device 500 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 509, or installed from the storage 508, or installed from the ROM 502. When the computer program is executed by the processing apparatus 501, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, any currently known or future developed network protocol, such as HTTP (HyperText Transfer Protocol) can be used for communication, and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, causes the electronic device to: acquire a text to be synthesized marked with stress words; input the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized in the following manner: determining a sequence of phonemes corresponding to the text to be synthesized; determining phoneme level stress labels according to the stress words marked in the text to be synthesized; generating audio information corresponding to the text to be synthesized according to the sequence of phonemes and the stress labels.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure can be implemented in software or hardware. Wherein, the name of the module does not constitute a limitation on the module itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a method for speech synthesis, comprising:

acquiring a text to be synthesized marked with stress words;

inputting the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized in the following manner:

determining a sequence of phonemes corresponding to the text to be synthesized;

determining phoneme level stress labels according to the stress words marked in the text to be synthesized;

generating audio information corresponding to the text to be synthesized according to the sequence of phonemes and the stress labels.

According to one or more embodiments of the present disclosure, Exemplary Embodiment 2 provides the method of Exemplary Embodiment 1, the generating audio information corresponding to the text to be synthesized according to the sequence of phonemes and the stress labels includes:

vectorizing the sequence of phonemes corresponding to the text to be synthesized to obtain a phoneme vector, and vectorize the stress labels to obtain a stress label vector;

determining a target phoneme vector according to the phoneme vector and the stress label vector;

determining a Mel spectrum according to the target phoneme vector;

inputting the Mel spectrum into a vocoder to obtain audio information corresponding to the text to be synthesized.

According to one or more embodiments of the present disclosure, Exemplary Embodiment 3 provides the method of Exemplary Embodiment 2, the determining a Mel spectrum according to the target phoneme vector includes:

inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 4 provides the method of Exemplary Embodiment 2, the determining a target phoneme vector according to the phoneme vector and the stress label vector includes:

inputting the phoneme vector into an encoder, and determining the target phoneme vector according to the vector output by the encoder and the stress label vector;

the determining a Mel spectrum according to the target phoneme vector includes:

inputting the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 5 provides the method of any of Exemplary Embodiments 1-4, the stress words marked in the sample text are determined by:

acquiring a plurality of sample texts, each of which includes stress words marked with initial stress labels;

for each of the stress words marked with the initial stress label, if the stress word is marked as a stress word in each of the sample texts, adding a target stress label to the stress word;

if the stress word is marked as a stress word in at least two of the sample texts, in a case that the fundamental frequency of the stress word is greater than a preset fundamental frequency threshold and the energy of the stress word is greater than a preset energy threshold, adding a target stress label to the stress word;

for each of the sample texts, determining stress words in the sample text to which added with the target stress label as the stress words in the sample text.

According to one or more embodiments of the present disclosure, Exemplary Embodiment 6 provides the method of Exemplary Embodiment 5, the speech synthesis model is obtained by training in the following manner:

vectorizing a sequence of phonemes corresponding to the sample text to obtain a sample phoneme vector;

determining sample stress labels corresponding to the sample text according to the stress words marked in the sample text, and vectorizing the sample stress labels to obtain a phoneme level sample stress label vector;

obtaining a target phoneme vector according to the sample phoneme vector and the sample stress label vector, and determining a sample Mel spectrum according to the target phoneme vector;

calculating a loss function according to the sample Mel spectrum and the actual Mel spectrum corresponding to the sample audio, and adjusting parameters of the speech synthesis model through the loss function.

According to one or more embodiments of the present disclosure, Exemplary Embodiment 7 provides an apparatus for speech synthesis, the apparatus comprising:

an acquisition module configured to acquire a text to be synthesized marked with stress words;

a synthesis module configured to input the text to be synthesized into a speech synthesis model to obtain audio information corresponding to the text to be synthesized, the speech synthesis model being obtained by training sample texts marked with stress words and sample audios corresponding to the sample texts, the speech synthesis model being used to process the text to be synthesized by following modules:

a first determination submodule configured to determine a sequence of phonemes corresponding to the text to be synthesized;

a second determination submodule configured to determine phoneme level stress labels according to the stress word marked in the text to be synthesized;

a generation submodule configured to generate audio information corresponding to the text to be synthesized according to the sequence of phonemes and the stress labels.

According to one or more embodiments of the present disclosure, Exemplary Embodiment 8 provides the apparatus of Exemplary Embodiment 7, the generation submodule is configured to:

vectorize the sequence of phonemes corresponding to the text to be synthesized to obtain a phoneme vector, and vectorize the stress labels to obtain a stress label vector;

splice the phoneme vector and the stress label vector to obtain a target phoneme vector;

determine a Mel spectrum according to the target phoneme vector;

input the Mel spectrum into a vocoder to obtain audio information corresponding to the text to be synthesized.

According to one or more embodiments of the present disclosure, Exemplary Embodiment 9 provides the apparatus of Exemplary Embodiment 8, the generation submodule is configured to:

input the target phoneme vector into an encoder, and input a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 10 provides the apparatus of Exemplary Embodiment 8, the generation submodule is configured to:

input the phoneme vector into an encoder, and determine the target phoneme vector according to the vector output by the encoder and the stress label vector;

input the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

According to one or more embodiments of the present disclosure, Exemplary Embodiment 11 provides the apparatus of any of Exemplary Embodiments 7 to 10, further comprising following modules for determining the stress words marked in the sample text:

a sample acquisition module configured to acquire a plurality of sample texts, each of which includes stress words marked with initial stress labels;

an addition module configured to, for each of the stress words marked with the initial stress label, if the stress word is included in each of the sample texts, add a target stress label to the stress word; if the stress word is included in at least two of the sample texts, in a case that the fundamental frequency of the stress word is greater than a preset fundamental frequency threshold and the energy of the stress word is greater than a preset energy threshold, add a target stress label to the stress word;

a marking module configured to, for each of the sample texts, determine stress words in the sample text to which added with the target stress label as the stress words in the sample text.

According to one or more embodiments of the present disclosure, Exemplary Embodiment 12 provides the apparatus of Exemplary Embodiment 11, further comprising following modules for training the speech synthesis model:

a first training module configured to vectorize a sequence of phonemes corresponding to the sample text to obtain a sample phoneme vector;

a second training module configured to determine sample stress labels corresponding to the sample text according to the stress words marked in the sample text, and vectorize the sample stress labels to obtain a sample stress label vector;

a third training module configured to determine a target sample phoneme vector according to the sample phoneme vector and the sample stress label vector, and determine a sample Mel spectrum according to the target sample phoneme vector;

a fourth training module configured to calculate a loss function according to the sample Mel spectrum and the actual Mel spectrum corresponding to the sample audio, and adjust parameters of the speech synthesis model through the loss function.

According to one or more embodiments of the present disclosure, Exemplary Embodiment 13 provides a computer-readable medium having a computer program stored thereon, which, when executed by a processing apparatus, implements the steps of any of the methods for speech synthesis in Exemplary Embodiments 1 to 6.

According to one or more embodiments of the present disclosure, Exemplary Embodiment 14 provides an electronic device comprising:

a storage apparatus having a computer program stored thereon;

a processing apparatus configured to execute the computer program in the storage apparatus, so as to implement the steps of any of the methods for speech synthesis in the Exemplary Embodiments 1 to 6.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs operations has been described in detail in the method embodiments, which will not be described in detail here.

What is claimed is:

1. A method for speech synthesis, the method comprising:

acquiring a text to be synthesized marked with stress words;

inputting the text to be synthesized into a speech synthesis model to obtain audio information corresponding to the text to be synthesized, the speech synthesis model being obtained by training on sample texts marked with stress words and sample audios corresponding to the sample texts, wherein the stress words marked in the sample texts are determined by:

acquiring a plurality of sample texts each of which includes stress words with initial stress labels, for each of the stress words marked with the initial stress label, if the stress word is marked as a stress word in each of the sample texts, adding a target stress label to the stress word; if the stress word is marked as a stress word in at least two of the sample texts, in a case that the fundamental frequency of the stress word is greater than a preset fundamental frequency threshold and the energy of the stress word is greater than a preset energy threshold, adding a target stress label to the stress word, determining stress words to each of which the target stress label has been added as the stress words marked in the sample texts; and generating, by the speech synthesis model, the audio information corresponding to the text to be synthesized based on a sequence of phonemes corresponding to the text and stress labels corresponding to the stress words marked in the text, wherein the generating audio information corresponding to the text to be synthesized based on the sequence of phonemes and the stress labels comprises:

vectorizing the sequence of phonemes corresponding to the text to be synthesized to obtain a phoneme vector, vectorizing the stress labels to obtain a stress label vector, determining a target phoneme vector according to the phoneme vector and the stress label vector, determining a Mel spectrum according to the target phoneme vector, and inputting the Mel spectrum into a vocoder to obtain the audio information corresponding to the text to be synthesized.

2. The method according to claim 1, wherein the speech synthesis model is used to process the text to be synthesized by:

determining the sequence of phonemes corresponding to the text to be synthesized; and determining the stress labels corresponding to the stress words marked in the text to be synthesized.

3. The method according to claim 1, wherein the determining a Mel spectrum according to the target phoneme vector comprises:

inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

4. The method according to claim 3, wherein the target phoneme vector is obtained by splicing the phoneme vector and the stress label vector.

5. The method according to claim 1, wherein the determining a target phoneme vector according to the phoneme vector and the stress label vector comprises:

inputting the phoneme vector into an encoder, and determining the target phoneme vector according to the vector output by the encoder and the stress label vector;

the determining a Mel spectrum according to the target phoneme vector comprises:

inputting the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

6. The method according to claim 5, wherein the target phoneme vector is obtained by splicing the vector output by the encoder and the stress label vector.

7. The method according to claim 1, wherein the plurality of sample texts are a plurality of texts including different contents and the texts including the same content are marked initial stress labels by different users.

8. The method according to claim 1, wherein the initial stress labels in the sample text correspond to prosodic phrases.

9. The method according to claim 1, wherein the speech synthesis model is obtained by training in the following manner:

vectorizing a sequence of phonemes corresponding to the sample text to obtain a sample phoneme vector;

determining sample stress labels corresponding to the sample text according to the stress words marked in the sample text, and vectorizing the sample stress labels to obtain a phoneme level sample stress label vector;

determining a target sample phoneme vector according to the sample phoneme vector and the sample stress label vector, and determining a sample Mel spectrum according to the target sample phoneme vector;

calculating a loss function according to the sample Mel spectrum and the actual Mel spectrum corresponding to the sample audio, and adjusting parameters of the speech synthesis model through the loss function.

10. A non-transitory computer-readable medium having a computer program stored thereon, the program, when executed by a processing apparatus, execute operations comprising:

acquiring a text to be synthesized marked with stress words;

inputting the text to be synthesized into a speech synthesis model to obtain audio information corresponding to the text to be synthesized, the speech synthesis model being obtained by training on sample texts marked with stress words and sample audios corresponding to the sample texts, wherein the stress words marked in the sample texts are determined by:

acquiring a plurality of sample texts each of which includes stress words with initial stress labels, for each of the stress words marked with the initial stress label, if the stress word is marked as a stress word in each of the sample texts, adding a target stress label to the stress word; if the stress word is marked as a stress word in at least two of the sample texts, in a case that the fundamental frequency of the stress word is greater than a preset fundamental frequency threshold and the energy of the stress word is greater than a preset energy threshold, adding a target stress label to the stress word, determining stress words to each of which the target stress label has been added as the stress words marked in the sample texts; and generating, by the speech synthesis model, the audio information corresponding to the text to be synthesized based on a sequence of phonemes corresponding to the text and stress labels corresponding to the stress words marked in the text, wherein the generating audio information corresponding to the text to be synthesized based on the sequence of phonemes and the stress labels comprises:

vectorizing the sequence of phonemes corresponding to the text to be synthesized to obtain a phoneme vector, vectorizing the stress labels to obtain a stress label vector, determining a target phoneme vector according to the phoneme vector and the stress label vector, determining a Mel spectrum according to the target phoneme vector, and inputting the Mel spectrum into a vocoder to obtain the audio information corresponding to the text to be synthesized.

11. An electronic device, comprising:

a storage apparatus having computer programs stored thereon;

a processing apparatus configured to execute the computer programs in the storage apparatus, so as to execute operations comprising:

acquiring a text to be synthesized marked with stress words;

inputting the text to be synthesized into a speech synthesis model to obtain audio information corresponding to the text to be synthesized, the speech synthesis model being obtained by training on sample texts marked with stress words and sample audios corresponding to the sample texts, wherein the stress words marked in the sample texts are determined by:

acquiring a plurality of sample texts each of which includes stress words with initial stress labels, for each of the stress words marked with the initial stress label, if the stress word is marked as a stress word in each of the sample texts, adding a target stress label to the stress word; if the stress word is marked as a stress word in at least two of the sample texts, in a case that the fundamental frequency of the stress word is greater than a preset fundamental frequency threshold and the energy of the stress word is greater than a preset energy threshold, adding a target stress label to the stress word, determining stress words to each of which the target stress label has been added as the stress words marked in the sample texts; and generating, by the speech synthesis model, the audio information corresponding to the text to be synthesized based on a sequence of phonemes corresponding to the text and stress labels corresponding to the stress words marked in the text, wherein the generating audio information corresponding to the text to be synthesized based on the sequence of phonemes and the stress labels comprises:

vectorizing the sequence of phonemes corresponding to the text to be synthesized to obtain a phoneme vector, vectorizing the stress labels to obtain a stress label vector, determining a target phoneme vector according to the phoneme vector and the stress label vector, determining a Mel spectrum according to the target phoneme vector, and inputting the Mel spectrum into a vocoder to obtain the audio information corresponding to the text to be synthesized.

12. The electronic device according to claim 11, wherein the speech synthesis model is used to process the text to be synthesized by:

determining the sequence of phonemes corresponding to the text to be synthesized;

determining the stress labels corresponding to the stress words marked in the text to be synthesized.

13. The electronic device according to claim 11, wherein the determining a Mel spectrum according to the target phoneme vector comprises:

inputting the target phoneme vector into an encoder, and inputting a vector output by the encoder into a decoder to obtain corresponding Mel spectrum, wherein the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

14. The electronic device according to claim 13, wherein the target phoneme vector is obtained by splicing the phoneme vector and the stress label vector.

15. The electronic device according to claim 11, wherein the determining a target phoneme vector according to the phoneme vector and the stress label vector comprises:

inputting the phoneme vector into an encoder, and determining the target phoneme vector according to the vector output by the encoder and the stress label vector;

the determining a Mel spectrum according to the target phoneme vector comprises:

inputting the target phoneme vector into a decoder to obtain the Mel spectrum;

wherein, the encoder is used to determine pronunciation information of each phoneme in a sequence of phonemes corresponding to the input vector, and the decoder is used to perform conversion processing according to the pronunciation information of each phoneme corresponding to the input vector to obtain the Mel spectrum corresponding to each phoneme.

16. The electronic device according to claim 11, wherein the speech synthesis model is obtained by training in the following manner:

vectorizing a sequence of phonemes corresponding to the sample text to obtain a sample phoneme vector;

determining sample stress labels corresponding to the sample text according to the stress words marked in the sample text, and vectorizing the sample stress labels to obtain a phoneme level sample stress label vector;

determining a target sample phoneme vector according to the sample phoneme vector and the sample stress label vector, and determining a sample Mel spectrum according to the target sample phoneme vector;

calculating a loss function according to the sample Mel spectrum and the actual Mel spectrum corresponding to the sample audio, and adjusting parameters of the speech synthesis model through the loss function.

17. The non-transitory computer-readable medium according to claim 10, wherein the speech synthesis model processes the text to be synthesized by:

determining the sequence of phonemes corresponding to the text to be synthesized; and determining the stress labels corresponding to the stress words marked in the text to be synthesized.

18. The non-transitory computer-readable medium according to claim 10, wherein the determining a Mel spectrum according to the target phoneme vector comprises:

inputting the target phoneme vector into an encoder, and inputting a vector output by the encoder into a decoder to obtain corresponding Mel spectrum, wherein the encoder is configured to determine pronunciation information of each phoneme in a sequence of phonemes corresponding to the input vector, and the decoder is configured to perform conversion processing according to the pronunciation information of each phoneme corresponding to the input vector to obtain the Mel spectrum corresponding to each phoneme.

* * * * *